US009422171B2

(12) United States Patent
Kosak et al.

(10) Patent No.: US 9,422,171 B2
(45) Date of Patent: Aug. 23, 2016

(54) FILTER ASSEMBLY

(75) Inventors: Michael J. Kosak, Byron Center, MI (US); Michael K. Greene, Ada, MI (US); Daniel L. Schlenk, Grand Rapids, MI (US)

(73) Assignee: ACCESS BUSINESS GROUP INTERNATIONAL LLC, Ada, MI (US)

(*) Notice: Subject to any disclaimer, the term of this patent is extended or adjusted under 35 U.S.C. 154(b) by 586 days.

(21) Appl. No.: 13/570,292

(22) Filed: Aug. 9, 2012

(65) Prior Publication Data

US 2013/0037474 A1 Feb. 14, 2013

Related U.S. Application Data

(60) Provisional application No. 61/521,837, filed on Aug. 10, 2011.

(51) Int. Cl.
*B01D 35/30* (2006.01)
*C02F 1/30* (2006.01)
*C02F 1/32* (2006.01)
*C02F 1/00* (2006.01)

(52) U.S. Cl.
CPC ............. *C02F 1/325* (2013.01); *C02F 1/001* (2013.01); *C02F 2201/003* (2013.01); *C02F 2201/004* (2013.01); *C02F 2201/006* (2013.01); *C02F 2201/3228* (2013.01); *C02F 2301/026* (2013.01)

(58) Field of Classification Search
CPC ............. B01D 2201/0453; B01D 2201/291; B01D 2201/316; B01D 2201/305; B01D 2259/804; C02F 2201/003; C02F 2201/004; C02F 2201/006; C02F 2201/3228; C02F 2301/026
See application file for complete search history.

(56) References Cited

U.S. PATENT DOCUMENTS

| 3,189,179 | A |   | 6/1965  | McMichael |
|-----------|---|---|---------|-----------|
| 3,923,663 | A | * | 12/1975 | Reid .............................. 210/251 |
| 4,882,055 | A |   | 11/1989 | Stamstad |
| 4,929,354 | A | * | 5/1990  | Meyering et al. ........ 210/321.61 |
| 5,017,286 | A |   | 5/1991  | Heiligman |
| 5,252,206 | A |   | 10/1993 | Gonzalez |
| 5,556,542 | A | * | 9/1996  | Berman et al. ................ 210/232 |
| 5,840,185 | A |   | 11/1998 | Hughes et al. |
| 5,843,309 | A | * | 12/1998 | Mancil .......................... 210/205 |

(Continued)

FOREIGN PATENT DOCUMENTS

| CN | 2447039 Y | 9/2001 |
| CN | 1642614 A | 7/2005 |

(Continued)

OTHER PUBLICATIONS

International Search Report and Written Opinion for International Application No. PCT/US2012/050128, mailed Mar. 6, 2013.

*Primary Examiner* — Krishnan S Menon
*Assistant Examiner* — Bradley R Spies
(74) *Attorney, Agent, or Firm* — Warner Norcross & Judd LLP

(57) ABSTRACT

A filter assembly for a water treatment system includes a first end cap and a second end cap that secure about the ends of a filter. A central member extends through a central void in the filter. The filter assembly has corresponding non-adhesive locking mechanisms that interact to secure the filter assembly together. Two gaskets may sandwich the filter and a reflector may be positioned within the central member. An ultraviolet lamp may also be positioned within the central member.

19 Claims, 6 Drawing Sheets

(56) References Cited

U.S. PATENT DOCUMENTS

| | | | |
|---|---|---|---|
| 6,096,207 A * | 8/2000 | Hoffman et al. | 210/232 |
| 6,368,504 B1 | 4/2002 | Kuennen et al. | |
| 6,811,691 B2 | 11/2004 | Woodard, Jr. et al. | |
| 7,713,496 B2 | 5/2010 | Harris | |
| 7,857,974 B2 | 12/2010 | Jiang | |
| 2003/0213741 A1 * | 11/2003 | Wright et al. | 210/450 |
| 2004/0134851 A1 * | 7/2004 | Lucas et al. | 210/497.01 |
| 2005/0133459 A1 * | 6/2005 | Schulz | C02F 9/005 210/198.1 |
| 2007/0227963 A1 * | 10/2007 | Fick | B01D 29/21 210/433.1 |
| 2010/0089813 A1 * | 4/2010 | Tellier et al. | 210/236 |

FOREIGN PATENT DOCUMENTS

| | | |
|---|---|---|
| CN | 2829849 Y | 10/2006 |
| EP | 1938880 | 7/2008 |
| FR | 2929858 | 10/2009 |
| FR | 2954712 | 7/2011 |

* cited by examiner

FILTER ASSEMBLY

BACKGROUND OF THE INVENTION

This invention relates to filter assemblies. More particularly, this invention relates to filter assemblies for use in water treatment systems.

Many water treatment systems include some type of filtration media to filter contaminants out of the water. Typically, the filtration media is secured within the water treatment system with one or more applications of adhesive. The adhesive adds both material cost and labor cost to the manufacturing process. Adhesives also may add excess time to the process, as additional time may be required to allow the adhesive to cure.

SUMMARY OF THE INVENTION

The present invention provides a filter assembly that may be secured together quickly without the aid of adhesives or separate fasteners.

In one embodiment, the filter assembly includes a filter defining a central void, a first end cap positioned adjacent a first end surface of the filter and a second end cap positioned adjacent a second end surface of the filter. A central member extends through the central void in the filter and has a locking mechanism that engages a corresponding locking mechanism on at least one of the first and second end caps to secure the first and/or second end caps about the ends of the filter. The central member may define at least one inlet hole for receiving water into the central member. A reflector may be fitted inside the central member and an ultraviolet lamp may be positioned within the reflector for treating water flowing through the central member. A gasket may be positioned between each end cap and the filter. The gaskets may be separately manufactured and assembled with the end caps, or may be integrally formed with the end caps.

In another embodiment, the filter assembly includes a filter defining a central void and a filter retainer with a central member, a first end cap and a second end cap. The central member extends through the central void and has a locking mechanism. A flowpath may extend into an outer surface of the filter, through the filter, into the central member through an inlet hole, through the central member, and out of the filter assembly through an outlet hole in the first end cap. The flowpath may extend through the central member between an ultraviolet lamp and a reflector.

In another embodiment, the filter assembly includes a filter defining a void, a central member extending through the central void, a first end cap and a second end cap. The first end cap and/or second end cap include a shroud positioned adjacent the outer surface of the filter. An ultraviolet lamp may be positioned at least partially within the central member.

In another embodiment, a method is provided for assembling a filter assembly, including fitting a first gasket, a filter, and a second gasket on a central member extending from a first end cap. The method further includes inserting a reflector within the central member and securing a second end cap to the end of the central member using a non-adhesive locking mechanism.

In another embodiment, the method for assembling a filter assembly includes molding the central member in a reflective material.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

I. Construction

Figure 1:
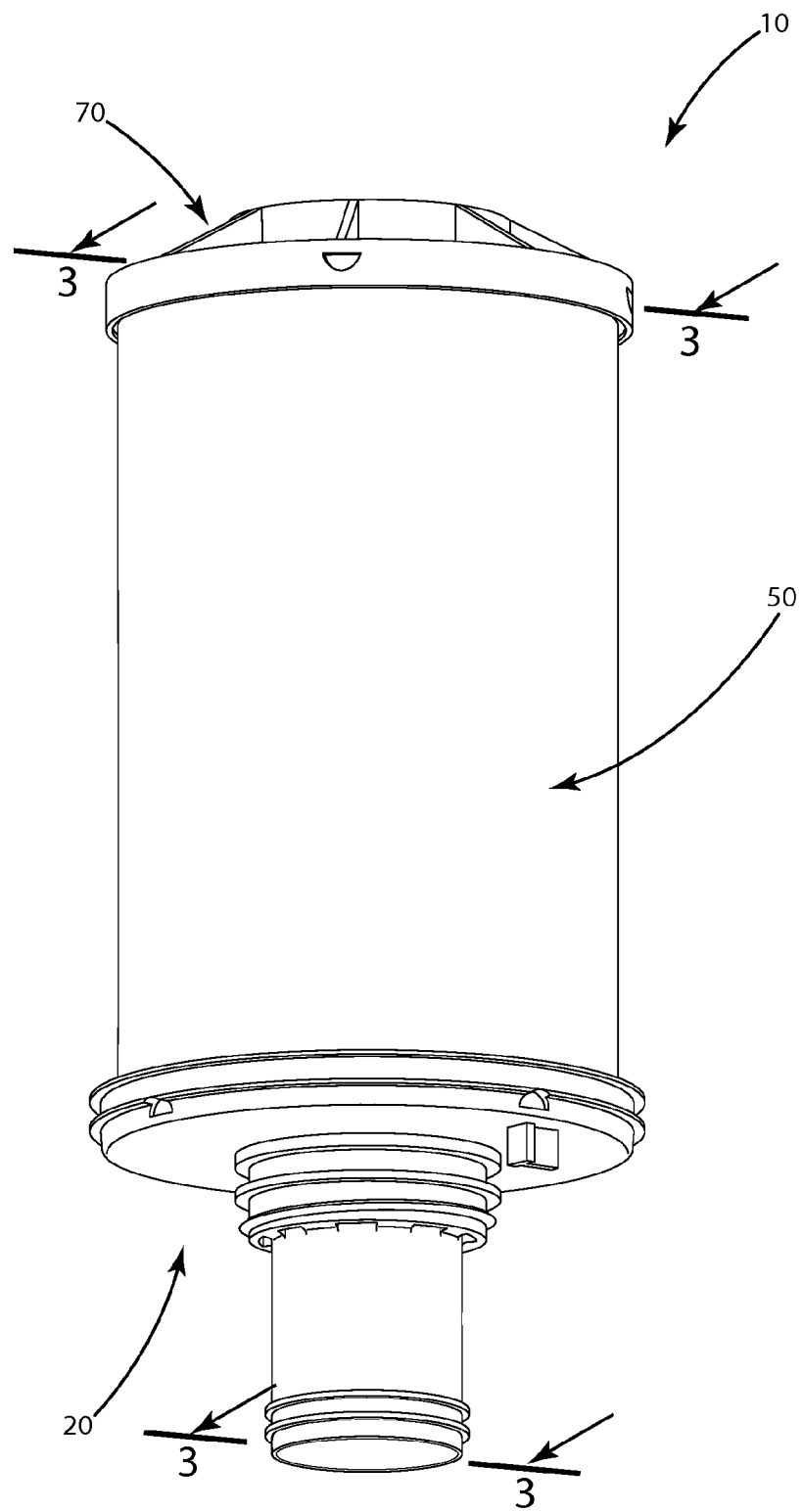
FIG. 1 is a front perspective view of one embodiment of the present invention.
Figure 2:
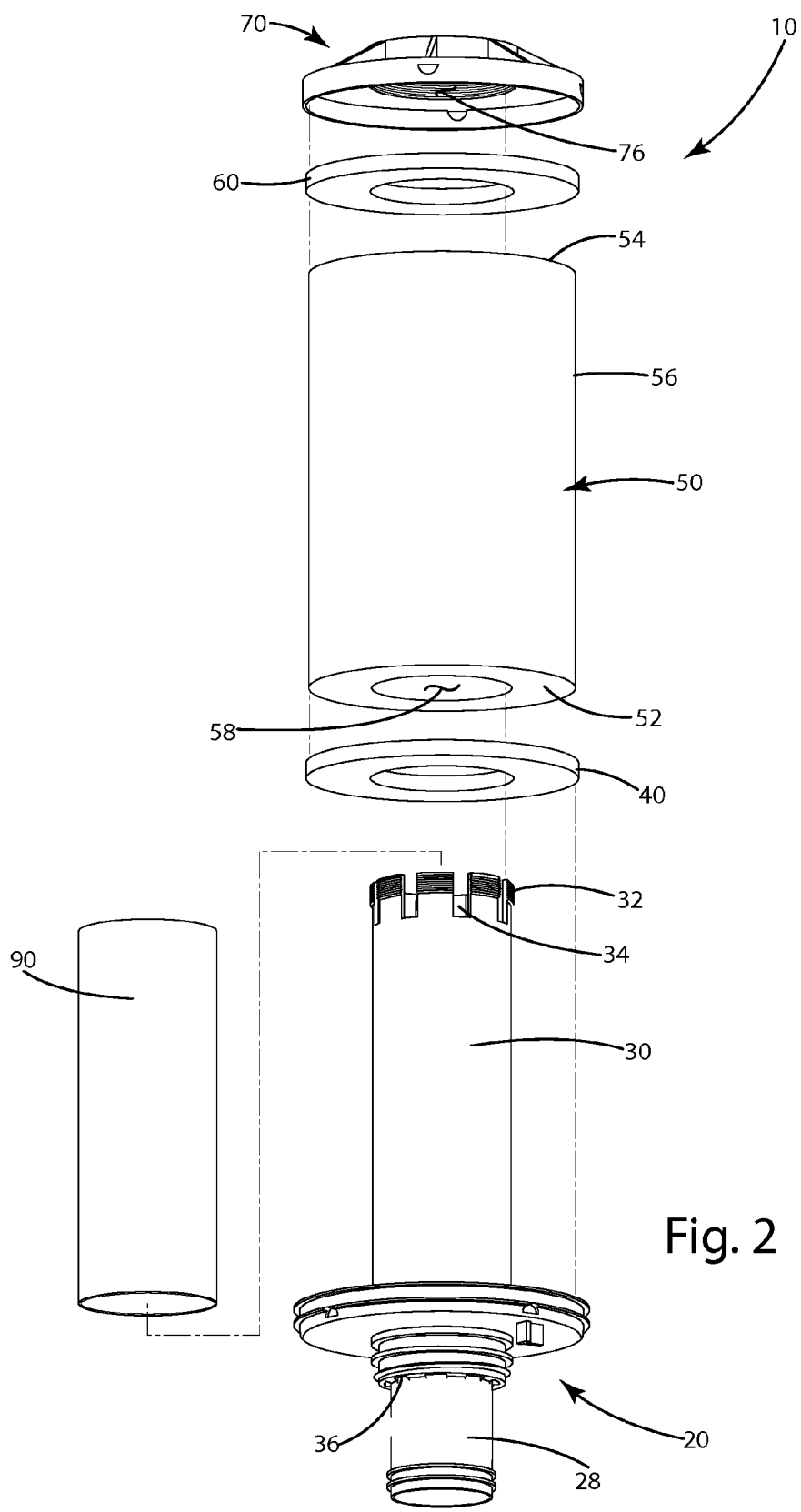
FIG. 2 is an exploded front perspective view of the embodiment of FIG. 1.
Figure 3:
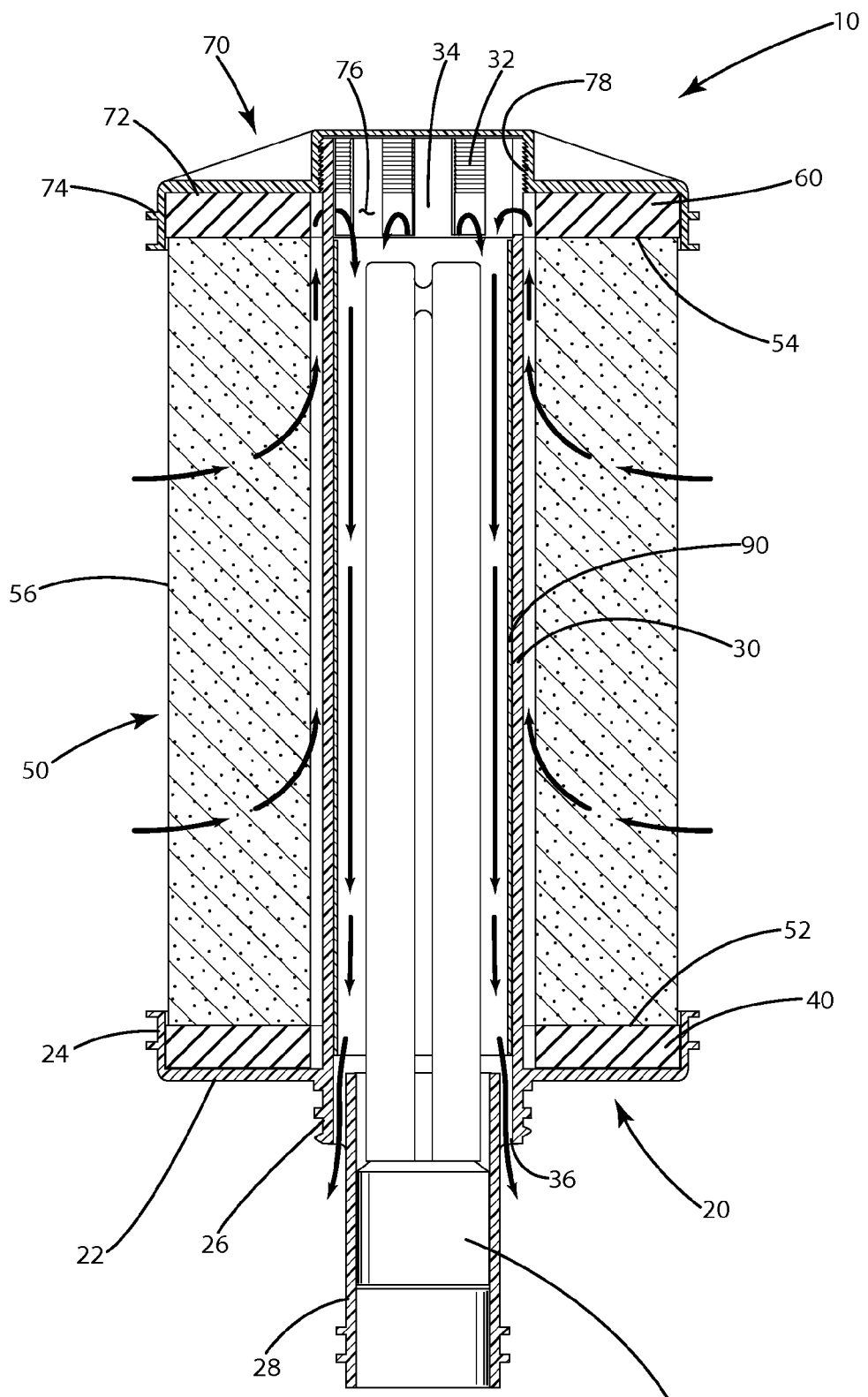
FIG. 3 is a sectional view along the line 3-3 in FIG. 1.

A filter assembly according to an embodiment of the present invention is shown in FIGS. 1-3 and generally designated 10. The filter assembly 10 generally includes a first end cap 20, a filter 50 and a second end cap 70. First and second gaskets 40, 60 sandwich the filter 50 and the first and second end caps 20, 70 secure about the ends of the gaskets 40, 60 and filter 50.

The filter 50 may be any suitable filter for treating water, including an activated carbon filter. The filter 50 generally has a first surface 52, a second surface 54 and an outer radial surface 56. The filter 50 defines a central void 58.

As shown in FIG. 3, the first end cap 20 includes a flat surface 22 and a circumferential lip 24 for engaging and enveloping the first gasket 40, the first surface 52 of the filter 50 and a portion of the outer radial surface 56. As shown in the illustrated embodiment, the circumferential lip 24 may include structural ribs to increase the strength of the circumferential lip 24. A threaded or ribbed portion 26 extends from the first end cap 20 and may interface with a water treatment system to secure the filter assembly 10 relative to the water treatment system. As shown in FIG. 3, a lamp extension 28 may extend from the first end cap 20 and may interface with or secure the filter assembly 10 relative to an ultraviolet lamp 100.

A central member 30 extends from the first end cap 20 through voids defined in the gaskets 40, 60 and the void 58 defined in the filter 50. The central member 30 may be integrally formed with the first end cap 20, or may be separately formed and attached to the first end cap 20. As shown in FIG. 2, the central member 30 has a locking mechanism 32 and defines at least one inlet hole 34 proximate the second surface 54 of the filter 50 when assembled (see FIG. 3). As shown in the illustrated embodiment, the inlet hole 34 may be a notch defined in the end of the central member 30. The locking mechanism 32 may be any suitable non-adhesive locking mechanism, including ribs, grooves, threads and snap-fit mechanisms. In the illustrated embodiment, the locking mechanism 32 is a series of equally spaced apart tabs extending from an end of central member 30 and separated by equally spaced apart notches. Each tab has an outer end portion that includes ridges that interfit with the internal ribs on the second end cap 70, as further described below. In this manner the locking mechanism 32 is integrated with the inlet holes 34. The notches may also enable flexing of the tabs for ease of insertion of the central member 30 into the second end cap 70. In an alternative embodiment, the locking mechanism 32 may also include the tab/notch configuration of the illustrated embodiment with threads defined in the tabs and second end cap 70 to secure the central member 30 and the second end cap 70 together by rotational movement relative to one another. The inlet hole 34 receives water into the central member 30, as further described below. The inner surface of the central member 30 may optionally include a coiled or spiral pathway configuration to encourage the water being treated to take more time as the flow spirals about the ultraviolet lamp as the water passes through the central member 30. The spiral path can be created using UV transparent tubing, using a spiral designed baffle, or by using any other suitable method. In another embodiment, the inner surface of the central member 30 can be smooth or otherwise configured to encourage direct flow through the central member 30. The first end cap 20 may also define at least one outlet hole 36 to enable fluid to flow from within the central member 30. In the illustrated embodiment, a plurality of outlet holes 36 are equally spaced apart about the circumference of the central member 30 at the junction between the central member 30 and the lamp extension 28. The outlet hole 36 allows water to exit from the filter assembly 10, as further described below.

As shown in FIG. 3, the second end cap 70 includes a flat surface 72 and a circumferential lip 74 for engaging and enveloping the second gasket 60, the second surface 54 of the filter 50. As shown in the illustrated embodiment, the circumferential lip 74 may include structural ribs to increase the strength of the circumferential lip 74. The second end cap 70 defines a void 76 for receiving the central member 30. The second end cap 70 includes a locking mechanism 78 adjacent the void 76 corresponding to and interfacing with locking mechanism 32 of central member 30. The locking mechanisms 32, 78 interact to secure the end caps 20, 70 about the ends of filter 50. The locking mechanism 78 may be any suitable non-adhesive locking mechanism, including ribs, grooves, threads and snap-fit mechanisms. As shown in FIG. 3, the locking mechanisms 32, 78 may have multiple, consecutive, internal ribs, which may allow the end caps 20, 70 to secure at various distances from each another. Accordingly, this configuration may accommodate filters of different lengths. This configuration also allows the locking mechanisms 32, 78 to automatically adjust during assembly to take-up any manufacturing tolerances that the assembly may have. For example, a manufacturing process may produce filters 50 of slightly different lengths due to the tolerances of the process. The locking mechanisms 32, 78 may automatically accommodate the slight differences in length when the locking mechanisms 32, 78 are secured together.

In the illustrated embodiment, each tab in locking mechanism 32 has an outer end portion that includes ridges that interfit with the internal ribs on locking mechanism 78. In this manner the second end cap 70 cooperates with the central member 30 to define the inlet holes 34, which are integrated with the locking mechanisms 32, 78 in the final assembly. The notches may also enable flexing of the tabs for ease of insertion of the central member 30 into the void 76 in second end cap 70. In an alternative embodiment, the locking mechanism 32 may include the tab/notch configuration of the illustrated embodiment with threads defined in the tabs and threads defined adjacent the void 76 in the second end cap 70 to secure the central member 30 and the second end cap 70 together.

An ultraviolet lamp 100 may be positioned within the lamp extension 28 and within the voids in the gaskets 40, 60 and the filter 50. A reflector 90 may be positioned between the central member 30 and the ultraviolet lamp 100 to reflect the ultraviolet light and maximize the ultraviolet treatment of the water as the water flows through the central member 30. The reflector 90 may be fixed, or may freely float without any attachment other than the coiled annular force of the reflector, pushing against the interior walls between the first and second end caps 20, 70 within central member 30. In another embodiment, at least the central member 30 may be molded in a reflective material, which eliminates the manufacturing step of separately inserting the reflector 90. Other elements of the filter assembly 10 may be molded in reflective material, including the second end cap locking mechanism 78. The ultraviolet lamp 100 may have a protective material, a quartz tube for example, to shield the ultraviolet lamp 100 from the water. In this configuration, the quartz tube and the reflector 90 may form an annular channel through which water may flow while being treated with ultraviolet light.

Although shown as cylinders, the end caps 20, 70, gaskets 40, 60, and filter 50 may be in any shape suitable for the application. The end caps 20, 70 may be made of any suitable material including plastic and composite, and may be manufactured using any suitable process. The gaskets 40, 60 may also be made of any suitable material including rubber, plastic and composite, and may be manufactured using any suitable process.

It is also contemplated that the central member 30 may extend from either end cap 20, 70, and the locking mechanisms 32, 78 may be positioned on either side of the filter 50. It is further contemplated that each end cap 32, 78 may have extensions that engage and lock together within the void 58 in the filter 50.

Figure 4:
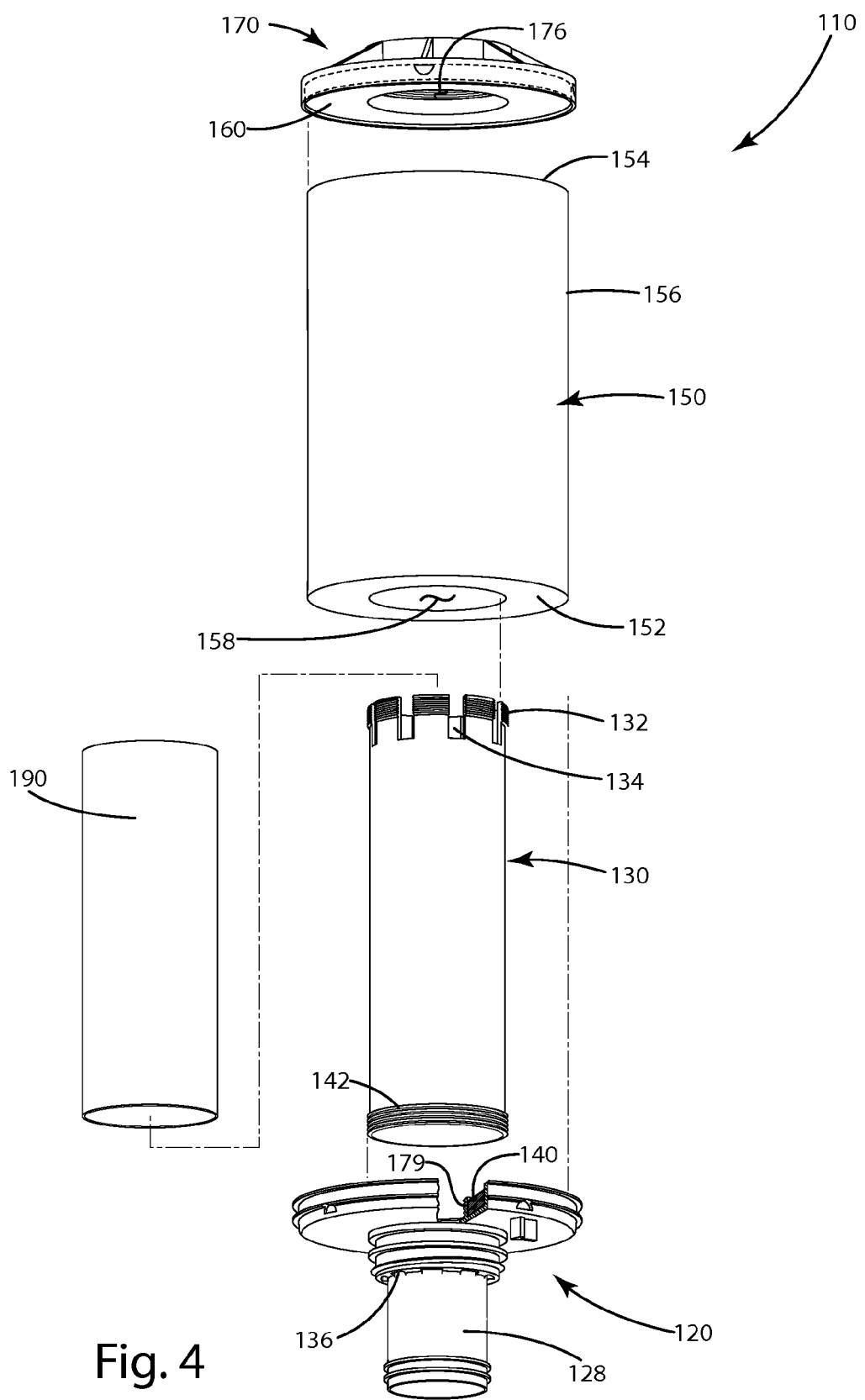
FIG. 4 is an exploded front perspective view of an embodiment of the present invention.

A filter assembly according to another embodiment of the present invention is shown in FIG. 4 and generally designated 110. This embodiment is generally similar to the embodiments described above, and elements functioning in the same manner as described above will not be redescribed here. In this embodiment, a locking mechanism 132, 142 may be positioned on each end of the central member 130, allowing the end caps 120, 170 to be separately secured to the central member 130. A locking mechanism 179 may be included in end cap 120 and may engage locking mechanism 142. As illustrated, the locking mechanism 179 may be positioned radially inward of and adjacent to the gasket 140. The locking mechanisms 132, 142, 179 may be any suitable mechanism, including those described above. In this embodiment, the gaskets 140 and 160 may be molded into or otherwise integrally formed with the end caps 120, 170. This may be accomplished with any suitable process, including a two-shot molding process.

Figure 5:
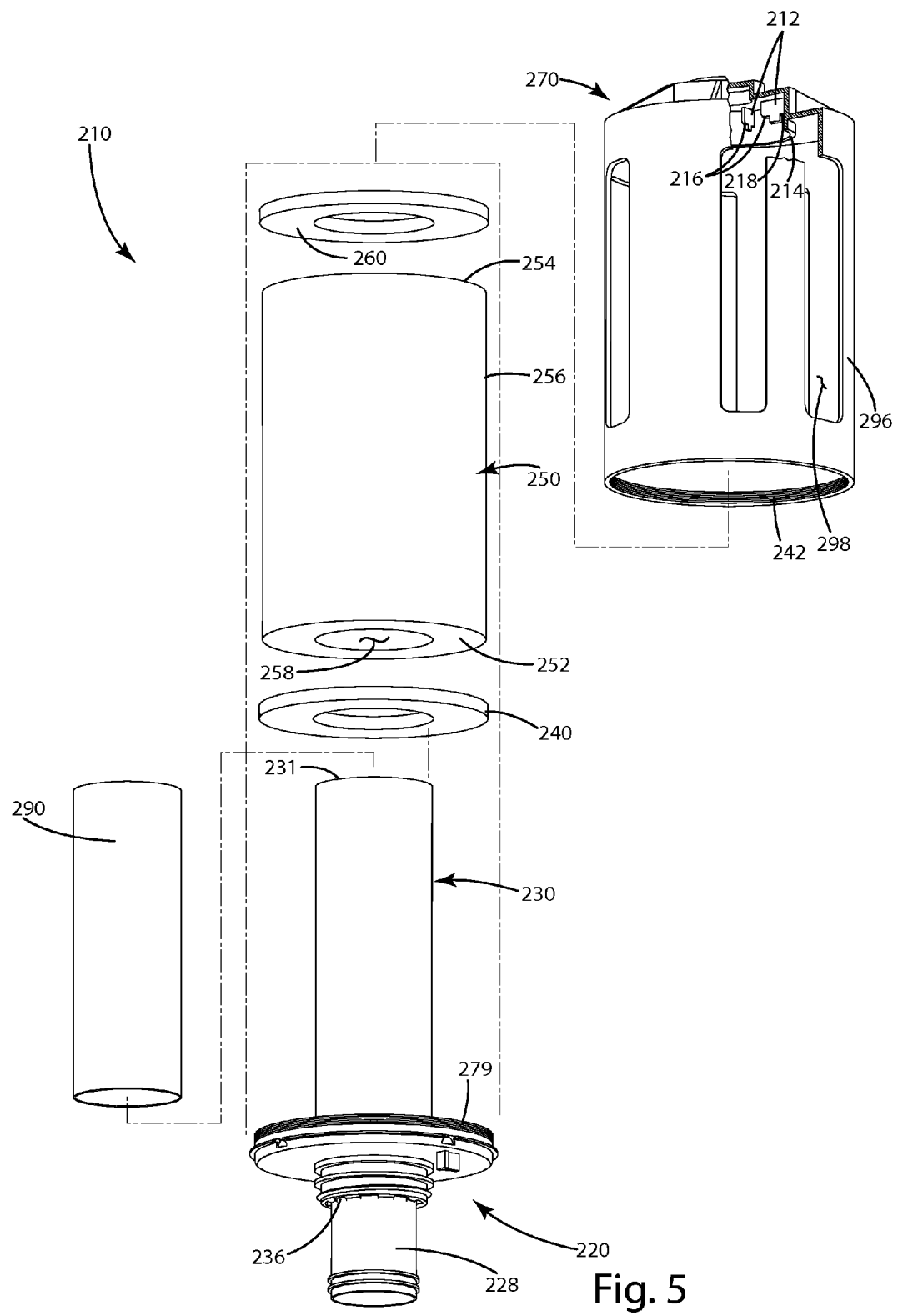
FIG. 5 is an exploded front perspective view of an embodiment of the present invention.

A filter assembly according to another embodiment of the present invention is shown in FIG. 5 and generally designated 210. This embodiment is generally similar to the embodiments described above, and elements functioning in the same manner as described above will not be redescribed here. In this embodiment, an outer shroud 296 may extend adjacent an outer surface 256 of the filter 250. The shroud 296 may enclose the filter 250 within the assembly and may eliminate a need for an outer wrap or other securing mechanism for the particles of filter 250. The shroud 296 may have a plurality of apertures 298 to allow water to pass through when entering the filter assembly 210. The apertures 298 may be sized to provide an adequate flow rate into the filter assembly 210, while preventing the undesired escape of particles from the filter 250. Optionally, the apertures 298 may be replaced by a mesh screen or wrap separately attached to, or integrally formed with the shroud 296. For example, the mesh screen or wrap may be molded into the shroud 296. In the illustrated embodiment, the shroud 296 is integrally formed with end cap 270, and includes a locking mechanism 242 at its lower edge adapted to secure with a locking mechanism 279 defined in first end cap 220. As illustrated, the locking mechanism 279 may be positioned at a radially outward edge of first end cap 220. Optionally, the shroud 296 may be made integral with first end cap 220 and lock into second end cap 270, or shroud 296 may be a separate piece and lock into both end caps 220, 270. The locking mechanisms 242, 279 may be any suitable mechanism, including those described above. Optionally, locking mechanisms may be defined in both end caps 220, 270 as described in other embodiments to secure the assembly 210 and the locking mechanisms 242, 279 may be removed. In this configuration, the lower edge of the shroud 296 may be pressed against the first end cap 220 and/or the gasket 240 to seal these pieces together via the force from the locking mechanisms on the end caps 220, 270. As illustrated, the second end cap 270 may include projections 212 and a wall 214 that extend from a lower surface of the second end cap 270. The projections 212 may define at least one inner notch 216 on a radially inward side of the projections 212 and at least one outer notch 218 on a radially outward side of the projections 212. The outer notches 218 may be positioned between the projections 212 and the wall 214. An edge 231 of the central member 230 may be positioned within the inner notches 216 and may engage projections 212. This configuration may space the edge 231 of the central member 230 from the second end cap 270 to allow water to flow through the space between adjacent projections 212 and into the central member 230.

Figure 6:
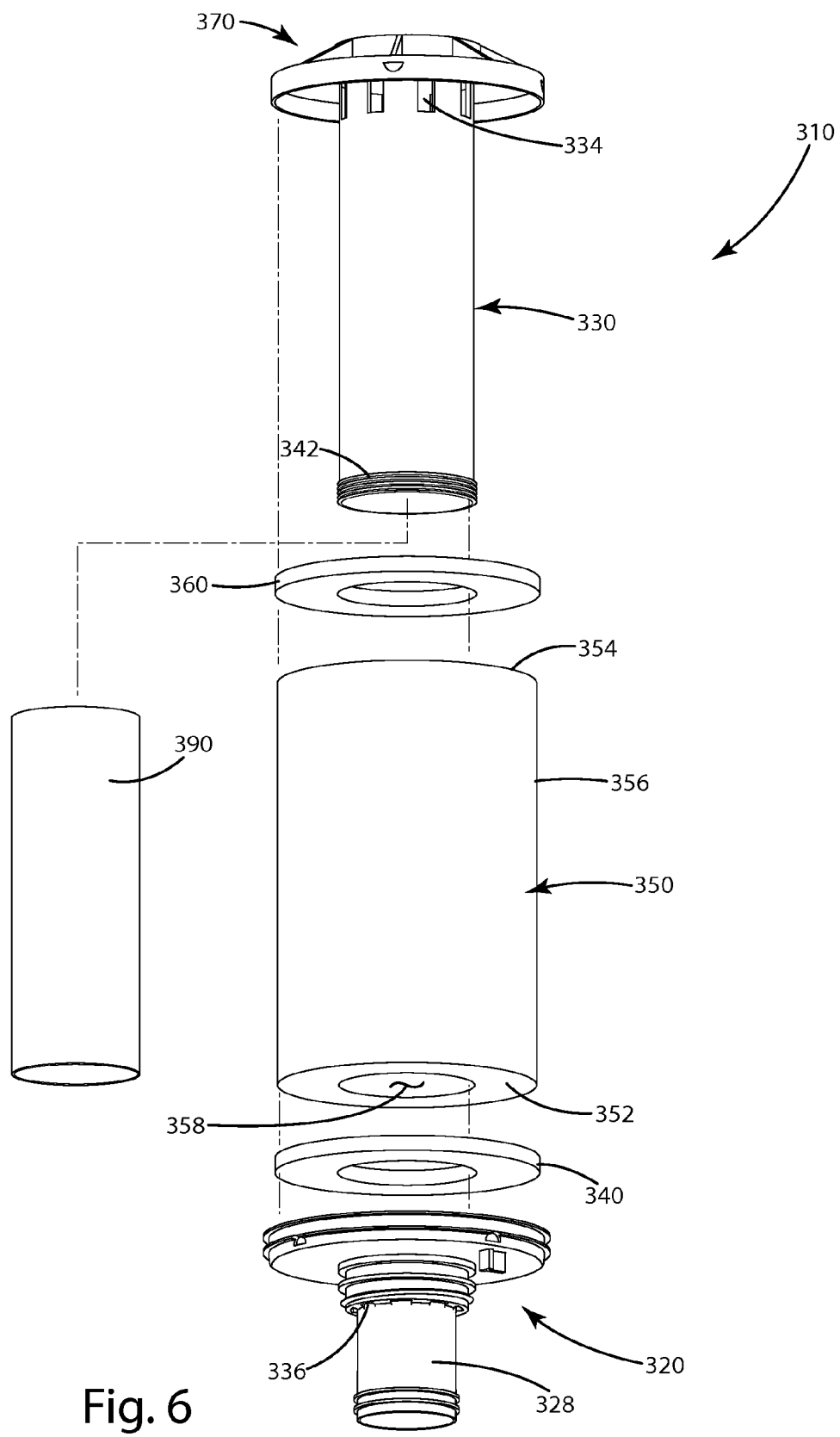
FIG. 6 is an exploded front perspective view of an embodiment of the present invention.

A filter assembly according to another embodiment of the present invention is shown in FIG. 6 and generally designated 310. This embodiment is generally similar to the embodiments described above, and elements functioning in the same manner as described above will not be redescribed here. In this embodiment, the end cap 370 may be integrally formed with the central member 330. The central member 330 may include a locking mechanism 342 that secures with a locking mechanism defined in first end cap 320. The locking mechanisms may be any suitable mechanism, including those described above.

II. Assembly and Use

The filter assembly 10 is assembled by fitting the first gasket 40, the filter 50, and the second gasket 60 onto the central member 30. If a reflector 90 is used, the reflector 90 may be inserted within the central member 30. The second end cap 70 is then inserted onto central member 30, engaging locking mechanism 78 with locking mechanism 32 to retain the end caps 20, 70 about the ends of the filter 50 and gaskets 40, 60. In this manner, the filter assembly 10 may be assembled quickly without the aid of adhesives or separate fasteners, which reduces labor and material costs.

The filter assembly 110 may be assembled similar to the method for filter assembly 10, except that the gaskets 140, 160 may be molded into the end caps 120, 170, and the end caps 120, 170 may be separately secured with the central member 130.

The filter assembly 210 may be assembled similar to the method for filter assembly 10, except that the shroud 296 may be integrally formed with the second end cap 270. The second end cap 270 and shroud 296 may be positioned over the filter 250 and gaskets 240, 260, and fitted onto the central member 230. An edge 231 of the central member 230 may be positioned within the one or more inner notches 216. The assembly may be secured with the locking mechanisms 242, 279 defined in the shroud 296 and the first end cap 220.

The flow path of water through the filter assembly 10 according to the illustrated embodiment is shown in FIG. 3. In this embodiment, water enters the filter assembly 10 through an outer radial surface 56 of filter 50. The water travels inward through the filter 50 toward the central member 30 and into the central member 30 through the inlet holes 34. While the water moves through the filter, various contaminants are removed from the water. The water then flows through the central member 30 between the reflector 90 and the ultraviolet lamp 100. As noted above, a quartz tube may surround the ultraviolet lamp 100 such that an annular channel is formed between the reflector 90 and the quartz tube for the water to flow through. While the water is flowing through the central member 30, the water is irradiated by ultraviolet light emitted by the lamp 100 and various organisms in the water are deactivated. Once the water reaches the first end cap 20, the water exits the filter assembly 10 through outlet holes 36. The water may be propelled through the assembly by any suitable force, including pump force and gravitational force.

Water may flow through the filter assemblies 110, 310 in a similar manner to that described for filter assembly 10. Water may flow through filter assembly 210 in a similar manner to that described for filter assembly 10, except that water may first flow through the apertures 298 defined in outer shroud 296 before reaching the filter 250.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits.

The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A filter assembly for a water treatment system, the filter assembly comprising:
   a filter defining a central void, the filter having a first end surface, a second end surface and an outer surface extending between the first end surface and the second end surface;
   a first end cap positioned adjacent the first end surface of the filter, the first end cap defining one or more outlet holes for water to exit the filter assembly;
   a central member extending through the central void in the filter, the central member having at least one central member locking mechanism, the central member defining at least one inlet hole for receiving water that has passed through the filter into the central member, said at least one inlet hole being integral with said at least one central member locking mechanism, the at least one inlet hole and at least one central member locking mechanism extending at least partially beyond the second end surface of the filter;
   an ultraviolet lamp positioned at least partially within the central member for treating water flowing through the central member;
   a second end cap positioned adjacent the second end surface of the filter; and
   a void defined in the second end cap for receiving the at least one central member locking mechanism, the void including at least one end cap locking mechanism integral with the second end cap, the at least one end cap locking mechanism engaging the central member locking mechanism to connect the first end cap to the second end cap,
   wherein the filter assembly is configured to be installed and removed from the water treatment system without removing the ultraviolet lamp from the filter assembly.

2. The filter assembly of claim 1 wherein the first end cap envelops the first end surface of the filter and the second end cap envelops the second end surface of the filter.

3. The filter assembly of claim 1 including a reflector positioned inside the central member.

4. The filter assembly of claim 3 wherein the reflector is adapted to be one of freely floating and fixed within the central member.

5. The filter assembly of claim 4 wherein the ultraviolet lamp is positioned within the reflector for treating water flowing through the central member.

6. The filter assembly of claim 1 including at least one of a first gasket positioned between the filter and the first end cap and a second gasket positioned between the filter and the second end cap.

7. The filter assembly of claim 6 wherein the at least one of the first gasket and second gasket are integral with at least one of the first end cap and the second end cap.

8. The filter assembly of claim 1 wherein one of the first end cap and the second end cap includes a shroud positioned adjacent the outer surface of the filter.

9. The filter assembly of claim 8 wherein apertures are defined in the shroud for allowing water to pass through the shroud.

10. The filter assembly of claim 1 wherein the central member is integral with the first end cap.

11. The filter assembly of claim 1 wherein a central member locking mechanism is defined on each side of the central member, and an end cap locking mechanism is defined on each of the first end cap and the second end cap.

12. A filter assembly for a water treatment system, the filter assembly comprising:
    a filter defining a central void, the filter having an outer surface;
    a filter retainer supporting the filter, the filter retainer including a central member having a first end and a second end, the central member extending through the central void, a first end cap adjacent the first end of the central member, the first end cap defining at least one outlet hole, and a second end cap adjacent the second end of the central member, the central member including a central member locking mechanism, the central member locking mechanism interlocking the first end cap to the second end cap, the central member locking mechanism comprising a plurality of spaced apart tabs extending from the second end of the central member, at least partially beyond an end surface of the filter, and separated by spaced apart notches, the spaced apart notches forming a plurality of inlet holes extending at least partially beyond the end surface of the filter;
    a flowpath extending into the outer surface of the filter, through the filter, into the central member through the plurality of inlet holes in the central member, through the central member, and out of the filter assembly through the at least one outlet hole in the first end cap, the flowpath being at least one of a direct flow and a spiral flow; and
    an ultraviolet lamp positioned at least partially within the central member for treating water flowing through the central member; and
    wherein the filter assembly is configured to be installed and removed from the water treatment system without removing the ultraviolet lamp from the filter assembly.

13. The filter assembly of claim 12 including a reflector, wherein the flowpath extends through the central member between the ultraviolet lamp and the reflector.

14. The filter assembly of claim 12 wherein the central member locking mechanism is a snap-fit locking mechanism.

15. A filter assembly for a water treatment system, the filter assembly comprising:
    a filter defining a central void, the filter having a first end surface, a second end surface and an outer surface extending between the first end surface and the second end surface;
    a first end cap positioned adjacent the first end surface of the filter, the first end cap defining one or more outlet holes for water to exit the filter assembly;
    a central member extending through the central void in the filter, the central member including at least one central member locking mechanism extending beyond the second end surface of the filter and defining at least one void for receiving water that has passed through the filter into the central member beyond the second end surface of the filter;
    a second end cap positioned adjacent the second end surface of the filter;
    at least one of the first end cap and the second end cap including a shroud positioned adjacent the outer surface of the filter; and
    an ultraviolet lamp positioned at least partially within the central member for treating water flowing through the central member,
    wherein the filter assembly is configured to be installed and removed from the water treatment system without removing the ultraviolet lamp from the filter assembly.

16. The filter assembly of claim 15 wherein at least one cap locking mechanism is defined in at least one of the first end cap and the second end cap.

17. The filter assembly of claim 16 wherein the central member includes an end, and the at least one central member locking mechanism is defined in the central member adjacent the end of the central member, the at least one cap locking mechanism engages the at least one central member locking mechanism, wherein the at least one void defined by the central member locking mechanism is a notch at the end of the central member, the notch spaced laterally from the central member locking mechanism about the circumference of the central member.

18. The filter assembly of claim 16 wherein the at least one cap locking mechanism includes at least one shroud locking mechanism defined in the shroud, the shroud locking mechanism engaging at least one of the first end cap and the second end cap.

19. The filter assembly of claim 15 wherein apertures are defined in the shroud for allowing water to pass through the shroud.

* * * * *